March 17, 1931. A. P. SLADE 1,796,484
METHOD AND MACHINE FOR FINISHING GEARS
Filed July 31, 1928 5 Sheets-Sheet 2
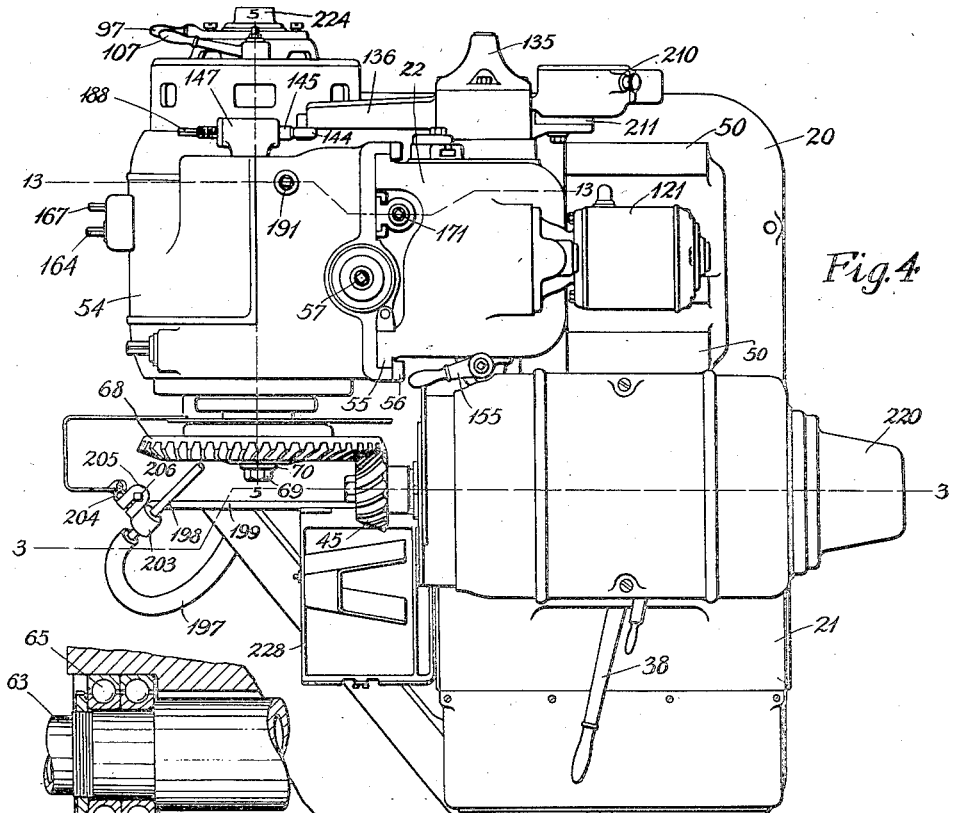
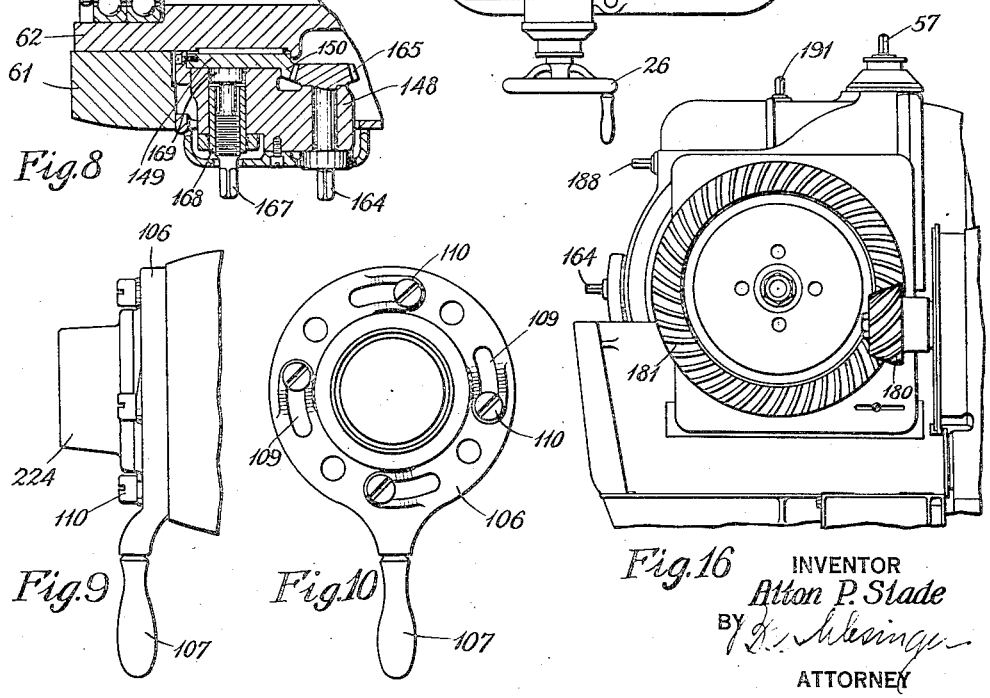
INVENTOR
Alton P. Slade
BY
ATTORNEY

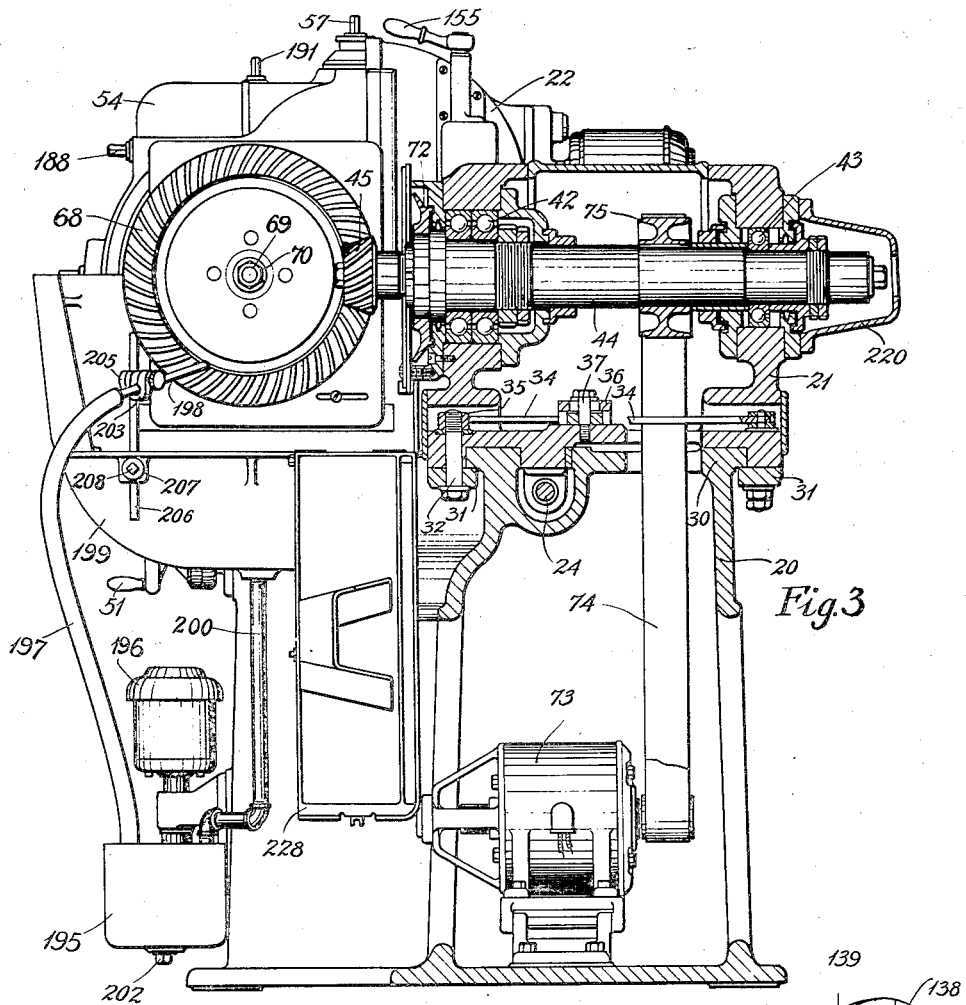
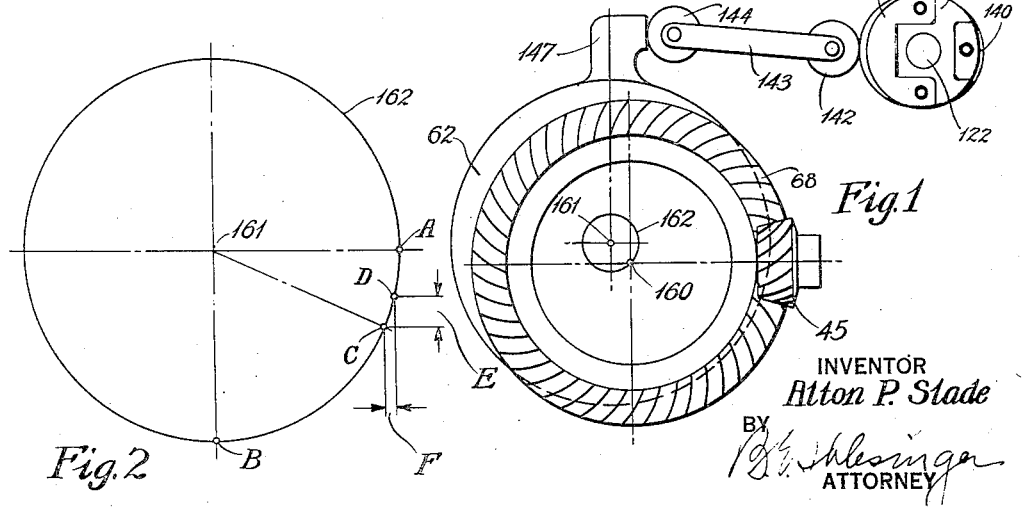

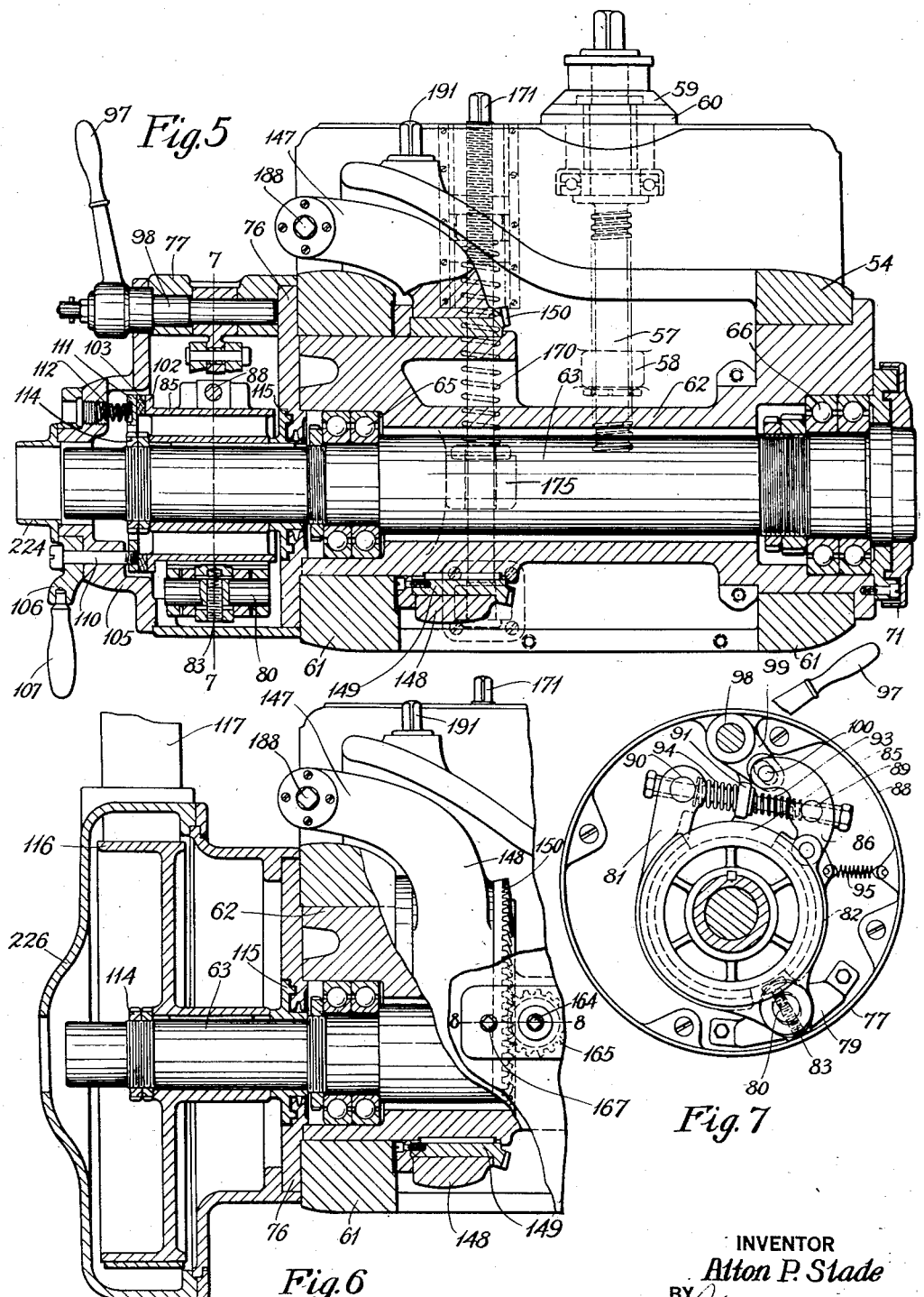

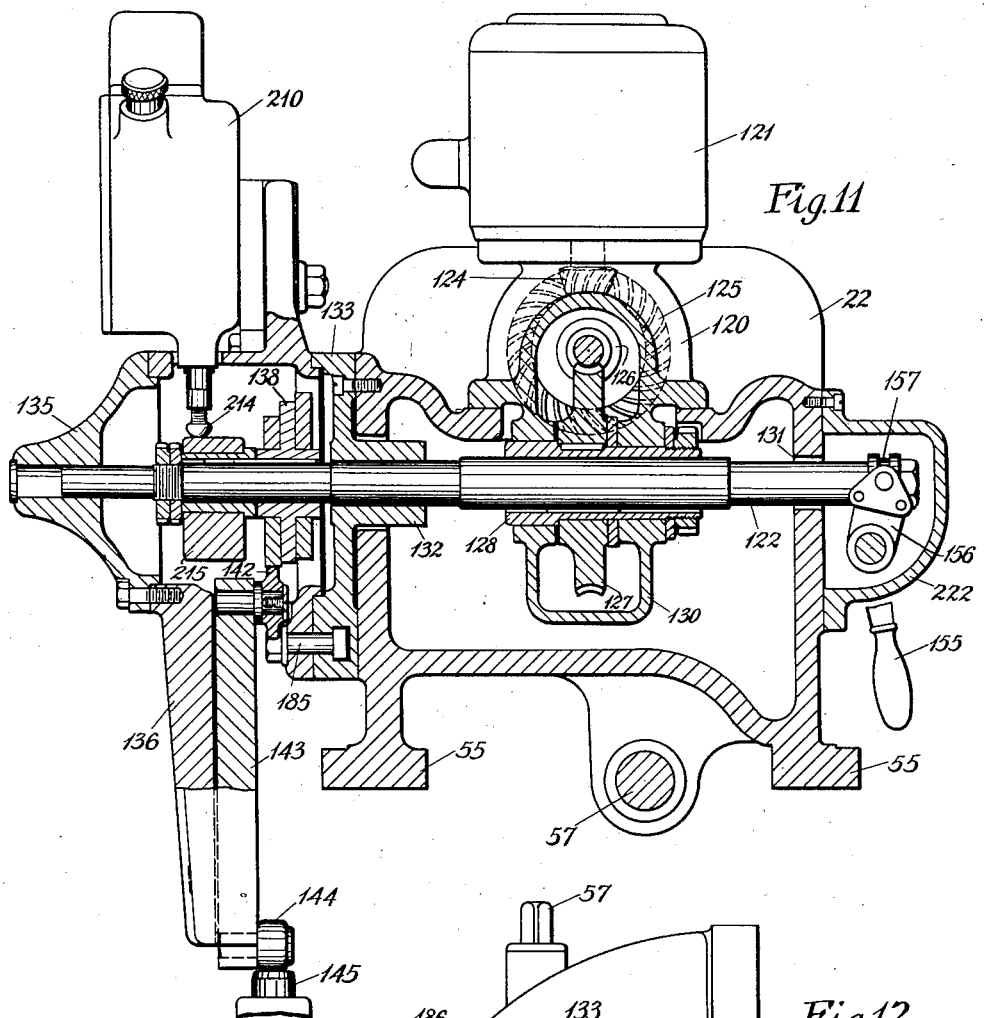
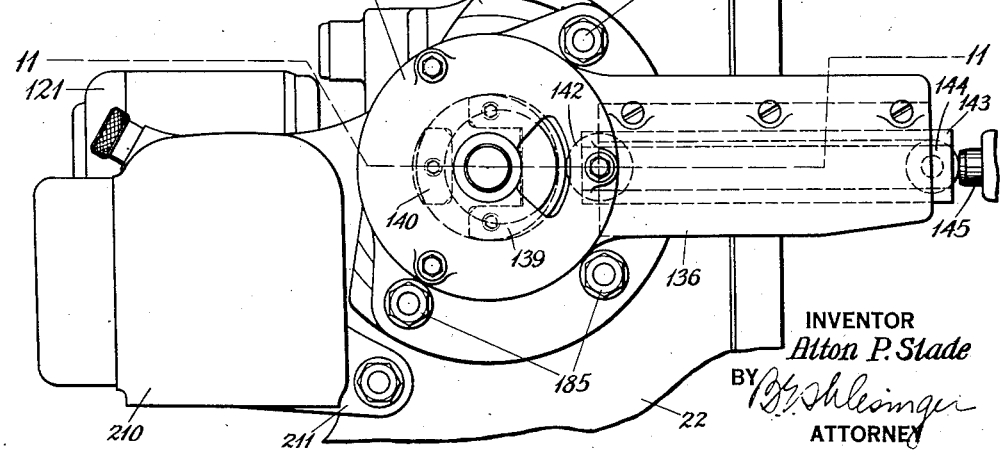

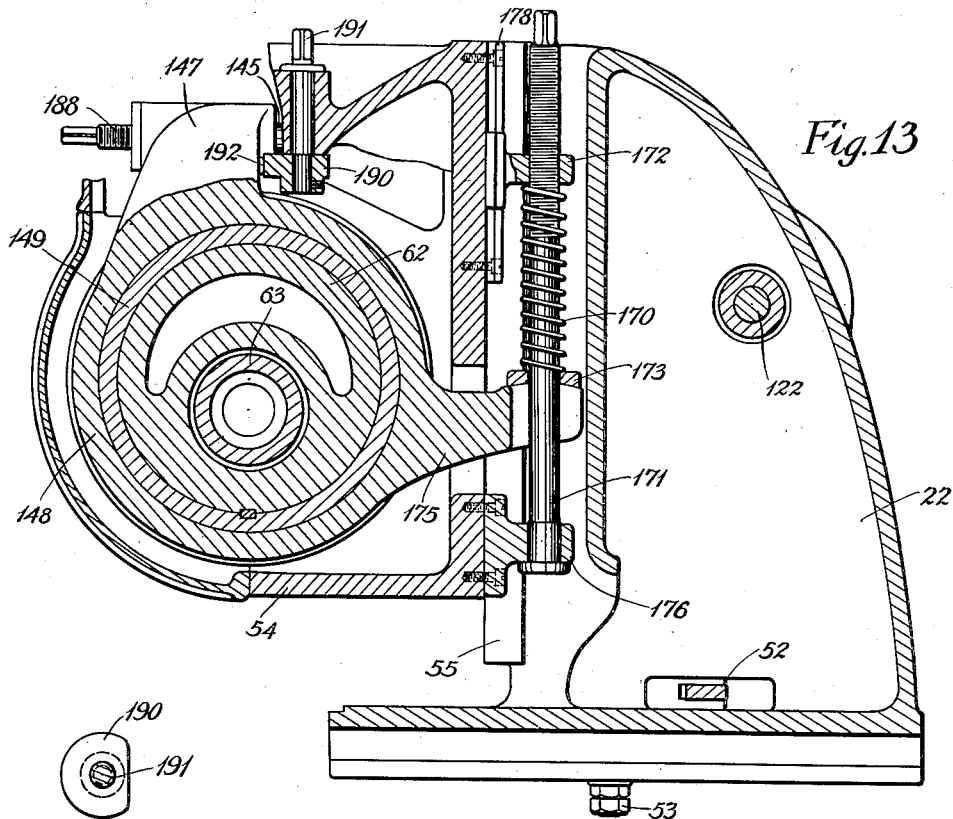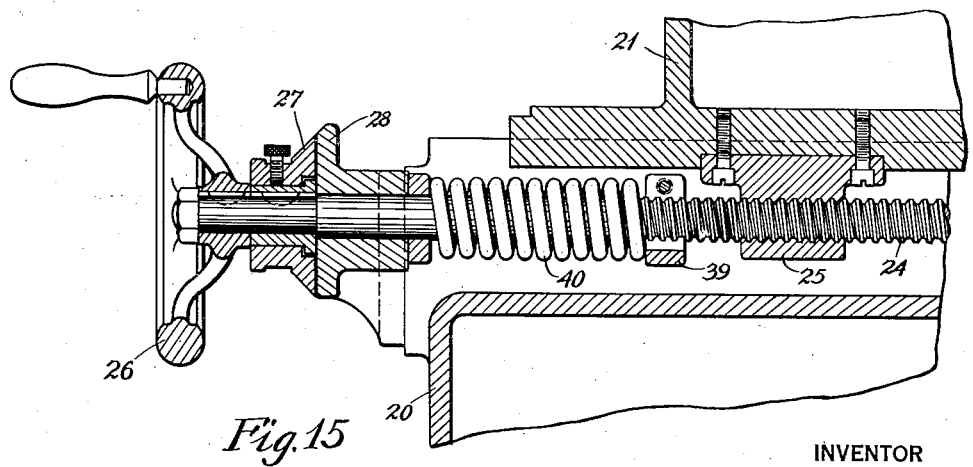

Patented Mar. 17, 1931

1,796,484

UNITED STATES PATENT OFFICE

ALTON P. SLADE, OF ROCHESTER, NEW YORK, ASSIGNOR TO GLEASON WORKS, OF ROCHESTER, NEW YORK, A CORPORATION OF NEW YORK

METHOD AND MACHINE FOR FINISHING GEARS

Application filed July 31, 1928. Serial No. 296,562.

The present invention relates to a method and machine for finishing gears and particularly to a method and machine for finishing tapered gears, such as spiral bevel and hypoid gears.

One object of the present invention is to provide an improved method and machine for removing such imperfections as flats, highspots, tool marks and other irregularities from the tooth surfaces of a pair of gears after they have been cut.

A further object of this invention is to provide a method and machine for finishing gears in which a variable predetermined movement can be produced between the mating tooth surfaces to provide a bearing or tooth surface contact of any desired nature between the mating tooth surfaces.

To remove flats, highspots, tool marks, etc., and to secure a practical tooth bearing it is usual to burnish or lap high quality gears. In either of these operations, the pair of gears which are to mate are customarily run together. Burnishing is effected before the gears are hardened and in this operation the gears are run together under pressure while such a relative movement is produced between the contacting tooth surfaces as to wear away any imperfections and secure the tooth bearing which is desired. Lapping is resorted to after hardening. This operation not only produces highly polished tooth surfaces but insures the correct bearing for in many instances, the tooth surface contact between mating tooth surfaces after the gears have been hardened is incorrect due to the distortion which takes place in the hardening operation. In the lapping operation, the gears are run together while an abrasive is applied between the contacting tooth surfaces and while ordinarily pressure or some relative movement is effected between the tooth surfaces. Burnishing and lapping may both be employed in manufacturing any one pair of gears, or only one or the other of these operations may be used.

The present invention may be practiced in either burnishing or lapping gears and its purpose is to provide an improved method and a machine for securing in either a burnishing or lapping operation a high tooth surface finish while producing substantially perfect meshing conditions between the gears with the bearing or tooth surface contact localized to the extent required by the conditions under which the gears are to run.

Other objects of the invention will be apparent to those skilled in the art hereinafter from the specification and from the recital of the appended claims.

In the drawings:

Figure 1 is a diagrammatic view illustrating one manner in which the present invention may be practised;

Figure 2 is a diagrammatic view on a considerably enlarged scale as compared with Figure 1 showing how an adjustment of the carrier on which one of the gears is mounted may be utilized to vary the proportion of in and out to up and down movements of the gears relatively to each other while being finished;

Figure 3 is a view of a machine constructed according to a preferred embodiment of this invention in a section substantially on the line 3—3 of Figure 4;

Figure 4 is a plan view of the machine shown in Figure 3;

Figure 5 is a section through the gear head of this machine taken substantially on the line 5—5 of Figure 4 with the gear removed;

Figure 6 is a fragmentary side elevation, partly in section, of this head, showing one way in which the machine may be converted from a lapping machine to a burnisher;

Figure 7 is a section taken substantially on the line 7—7 of Figure 5 and showing the manually operable brake for applying a pressure between the gears during lapping;

Figure 8 is a fragmentary section on the line 8—8 of Figure 6 showing the means for adjusting the gear spindle carrier relative to the oscillatory yoke and showing, also, the means for locking the carrier to the yoke after adjustment;

Figures 9 and 10 are a side view and an end elevation, respectively, of the adjustable plate for applying the blacklash brake;

Figure 11 is a section on the line 11—11 of Figure 12, showing the cam shaft and associated parts for actuating the oscillatory yoke;

Figure 12 is an end elevation of the parts shown in Figure 11;

Figure 13 is a section taken substantially on the line 13—13 of Figure 4;

Figure 14 is a detail view showing in plan the yoke throwout cam;

Figure 15 is a partial sectional view showing in detail the mechanism for adjusting the pinion head; and Figure 16 is a fragmentary elevation showing the gear head adjusted vertically to a different position from that shown in Figure 3, in order to offset the axis of the gear relative to that of the pinion.

With the present invention, the gears to be finished are brought into mesh and rotated together while simultaneously a relative movement is produced between the gears to cause them to move simultaneously in and out relatively to each other and back and forth transversely of their teeth thereby to produce the results desired. The present invention has particular reference to the finishing of tapered gears. Here the gears are meshed with their axes angularly disposed to each other and rotated together while the additional relative movement described is produced between them. This additional relative movement is then in the nature of a motion back and forth in the direction of the axis of one gear and back and forth transversely of this axis.

In the embodiment of the invention illustrated, which is a present preferred form of machine for finishing tapered gears, one of the gears is mounted upon a carrier with its axis eccentrically disposed to the axis of the carrier and during the rotation of the gears in mesh, an oscillatory movement is imparted to the yoke to which the carrier is connected to effect the required in and out and back and forth transverse movement. The oscillatory movement of the yoke is produced by means of a cam and follower. Through the oscillatory movement, the bearing resulting from contact of the teeth of the gears is moved from the center to one end of the teeth and back again and then to the other end of the teeth and back again in one revolution of the cam. If the cam is constructed to give a dwell between oscillations, the gears can be run in correct meshing position for any part of the cycle as may be determined by the length of the dwell.

By this invention, then, the tooth surfaces can be worn away to any desired extent at the ends of the teeth and the tooth bearing concentrated or localized in the center of the mating tooth surfaces. The carrier is also made adjustable in the yoke in order to secure any desired proportion of in and out to back and forth transverse motion.

When lapping a pair of spiral bevel or hypoid gears with this invention, a lapping compound is, of course, applied to the gears while they are running together. The pinion is preferably the driver. In the preferred form of machine the lapping compound is pumped onto the gears, a backlash brake is provided to eliminate backlash between the gears while running in mesh and a manually operable brake is also supplied to permit of varying the pressure between the teeth of the gears during the operation of the machine.

Various methods may be practised in burnishing. In one case, the gear is made the driver while the additional relative movement described is effected. In another and the at present preferred method of burnishing, the gears are brought into mesh with the teeth of one member bottoming in the tooth spaces of the other and either the gear or the pinion may be the driver, the carrier being oscillated all the while to produce between the gears the desired additional relative motion. Where the teeth of the gears are bottomed as just described, the teeth of the pinion are held resiliently in engagement with the teeth of the gear by a resilient connection between the pinion head and the frame of the machine on which this head is adjustably mounted.

Referring now to the drawings by numerals of reference, 20 indicates the base or frame of the machine. On the base or frame 20 are adjustably mounted a pair of heads 21 and 22, respectively, which are movable on the base at right angles to each other, to bring the gears to be burnished or lapped into mesh.

The head 21 can be adjusted on the base 20 by rotating the screw 24 (Figs. 3 and 15) which threads into a nut 25 that is secured to the head 21. The hand-wheel 26 serves to rotate the screw 24 and a dial 27 may be provided which can be secured to the shaft of the screw 24 so as to permit setting the head 21 to any desired position. The dial 27 can be read against an index mark provided at any suitable point on the bearing 28 provided on the frame and in which the screw shaft is mounted. In its adjustment, the head 21 moves on ways 30 (Fig. 3) formed on the frame 20. The head 21 can be secured fixedly in any adjusted position by means of the gibs 31 and the bolts 32. A simple device for clamping or releasing both nuts simultaneously is provided. A link 34 is pivotally connected to each of the nuts 35 and the two links 34 are pivotally connected at their opposite ends to a cross-piece 36 which is pivotally mounted on the stud 37 secured to the head 21. The cross-piece 36 can be rocked about the stud 37 to move the nuts 35 into released or clamping position by means of the lever 38 (Fig. 4) which is secured in any suitable manner to the cross-piece 36.

Instead of clamping the head 21 fixedly in position, it is frequently desirable to hold the head resiliently in place so as to permit such movement of the head as may be required by the intermeshing action of the two gears to be finished, as will be more particularly pointed out hereinafter. For the purpose of providing this resilient connection, a collar 39 is provided which is clamped to the screw 24 and between this collar and the bearing 28 on the frame of the machine, is mounted a heavy coil spring 40 which surrounds the screw shaft.

Journaled in the head 21 in suitable anti-friction bearings 42 and 43 provided therefor in the head, is the spindle 44 to which one member of the pair to be finished, as the pinion 45, may be secured.

The head 22 is in the form of a column or upright. This head 22 is slidable on the ways 50 provided on the base or frame (Fig. 4) and can be adjusted by means of a screw and nut (not shown) by rotating the handwheel 51 (Fig. 3). It may be locked fixedly in any adjusted position by a pair of bolts actuated by a linkage and a lever similar to that employed in locking the head 21 fixedly in position. A part of the linkage is shown in Fig. 13 at 52 and the nuts cooperating with one of the bolts are shown at 53.

Mounted on the head or column 22 for vertical adjustment thereon is a slide 54. The slide 54 slides on the ways 55 (Figs. 4 and 13) in its adjustment and can be secured in any adjusted position by means of the gibs 56 and bolts (not shown). The vertical adjustment can be effected by the screw 57 which is mounted in the slide 54 and threads into a nut 58, (Fig. 5) secured to the head or column 22. An indicator dial 59 secured to the screw 57 which reads against an index mark (not shown) on the collar 60 secured to the slide 54 serves to permit of accurately setting the slide to any desired position of adjustment.

The slide 54 serves as a housing for the oscillatable carrier 62 (Figs. 5 and 13) which is adjustable in the bearings 61 provided therefor on the slide 54. The gear spindle 63 is journaled eccentrically in the carrier 62, being mounted in suitable anti-friction bearings 65 and 66.

The other member of the pair to be lapped or burnished, as for instance, the gear 68 is secured to the spindle 63, by any suitable means, as by the bolt 69 and washer 70 (Figs. 3 and 4). The pinion 45 can be secured to its spindle in like manner as by a bolt and washer. A labyrinth dust cap 71 (Fig. 5) is provided for the gear spindle to prevent the lapping compound from getting into the bearings and a similar dust cap 72 (Fig. 3) may be provided for the pinion spindle 44.

During the operation of the machine in either burnishing or lapping, one of the spindles is driven to rotate the two gears 45 and 68 together by their intermeshing engagement and simultaneously an oscillatory motion is imparted to the carrier 62 causing the spindle 63 and the gear 68 mounted thereon to move in and out and up and down relative to the pinion 45 during the rotation of gear and pinion together. For lapping, the pinion is preferably the driver and for this purpose the pinion spindle 44 may be rotated from the motor 73, (Fig. 3) mounted in the base of the machine, the motor being operatively connected with the spindle 44 by means of the belt 74 and the pulley 75 which is keyed to the spindle 44.

For burnishing, either the pinion or the gear may be the driver. If the pinion is the driver, then the pinion spindle 44 can be driven from the motor 73 through the belt 74 and pulley 75 as already described for lapping. If the gear is the driver, then the backlash brake and the hand brake which will be described more particularly hereinafter, can be removed from the gear spindle 63 and a separate pulley drive to which reference will be made later, may be secured to this spindle.

The construction and operation of the backlash and hand brakes will now be described. Secured to the rear bearing 61 for the carrier 62 is a plate 76 (Fig. 5). To this plate 76 is removably secured a sleeve 77 which forms a housing for the hand or service brake. Mounted in a bracket 79 secured to the plate 76 (Fig. 7) is a pin 80 which forms a pivot for the two brake arms 81 and 82 constituting the brake proper. The pin 80 is held against rotation in the bracket 79 by means of the set screw 83. The brake drum 85 is keyed to the gear spindle 63 and the arms 81 and 82, which are provided with suitable friction linings are adapted to be forced into engagement with this drum to apply any desired pressure between the gear 68 and pinion 45 as the two run together. Pivoted to the brake arm 82 is an arm 86. The arms 86 and 81 are connected by a pin 88 which passes through blocks 89 and 90, respectively, swivelly mounted in the arms 86 and 81. The pin 88 passes, also through an eye or hole formed in the piece 91 which is secured to the plate 76 and between this piece 91 and the two arms 86 and 81 are interposed a pair of coil springs 93 and 94, respectively, which tend at all times to actuate the brake arms 81 and 82 into released or non-braking position. An auxiliary coil spring 95 which is secured at one end to the brake arm 82 and at the other end to the sleeve 77 assists the springs 93 and 94 in their action.

The brake can be applied by moving the hand lever 97 which is secured to the pin 98 that is journaled in suitable lugs provided therefor on the sleeve 77. Secured to the pin 98 is an arm 99 which has a pin and slot connection, indicated generally at 100, with the arm 86. It will be seen that as the lever 97 is depressed a braking action will be applied to the drum 85 and through the drum to the spindle 63. Through this means, a considerable pressure can be applied to the gears 45 and 68 as they are running together in mesh. The hand or service brake just described is useful in lapping when it is desired to wear down part of the tooth surfaces rapidly, while in the testing of the gears to determine the progress of the finishing operation, it is employed to apply loads such as the gears will have to carry in use so that the gears can be tested on the machine under conditions approximating as nearly as possible those encountered in use.

As one of the gears to be lapped or burnished drives the other during the operation of the machine, it is desirable particularly during lapping, to provide a backlash brake to prevent backlash between the gears affecting the uniformity of their motion which would result in any errors present in the gears being aggravated and not removed as desired. This serves, also, to create at all times a moderate pressure between the gears so that the abrasive will perform its function. The brake drum 85 is provided at its outer end with a flange 102 to which is secured a suitable brake material 103. Secured to the sleeve 77 is a sleeve 105 which forms a bearing for an adjustable plate 106 adapted to be rotated by the handle 107 (Figs. 5, 9, and 10). The plate 106 is provided with a plurality of arcuate slots 109 through which pass a corresponding number of bolts 110 which are secured to the plate 111 that is adapted to engage the brake surface 103 of the brake drum 85. The portions of the plate 106 bounding the slots 109 are beveled as shown clearly in Figures 9 and 10. A series of springs 111 alternating with the bolts 110 serve to urge the plate 111 constantly into braking position. When the plate 106 is rotated in one direction by the handle 107 the springs 112 are free to apply a braking pressure to the drum 85, sufficient to counteract the backlash between the gears 45 and 68 so that the gears will rotate uniformly in mesh, while when the handle 107 is moved in the opposite direction, this braking pressure is released, because the heads of the bolts 110 ride up on the beveled portions of the plate 106 and pull the plate 111 away from the braking surface 103.

The brake drum 85 can be secured to the gear spindle 63 by means of the nuts 114. When the brake drum is in position, the labyrinth cap 115, which with the cap 71 protects the spindle from dirt or foreign matter, is held in position.

When it is desired to rotate the gear spindle instead of the pinion spindle in burnishing, the backlash and service brakes can be removed and a pulley 116 (Fig. 6) secured instead to the gear spindle 63 by means of the nuts 114. This pulley 116 can be driven by the belt 117 from any suitable source of power. When the pulley 116 is in position, the belt 74 is slipped off the pulley 75 so that the pinion spindle 44 is driven from the gear.

So far, I have described the means for rotating and the means for applying a brake load to the gears. I shall describe next the mechanism for oscillating the gear spindle carrier 62 to move the gear 68 simultaneously in and out and up and down with reference to the pinion 45.

Secured to the column or head 22 (Figs. 4 and 11) is a bracket 120 that serves as a support for a motor 121. This motor 121 serves to rotate the cam shaft 122 through the spiral bevel gearing 124, 125, the worm 126 and the worm wheel 127, the latter being keyed to the sleeve 128 which has a splined connection with the cam shaft 122. The sleeve 128 is journaled in a U-shaped bracket 130 formed integral with the motor bracket 120. The cam shaft 122 is slidable in the sleeve 128, in an aperture 131 in the head 22, in a bearing 132 formed integral with the plate 133 which is secured to one side face of the column 22, and in a bearing 135 which is secured to the bracket 136 that is angularly adjustable on the plate 133. Keyed to the cam shaft 122 is a disc 138 to the opposite sides of which are secured two sets of cam plates. Each set of cam plates consist of two removable pieces, such as shown at 139 and 140 in Figs. 1 and 12. The two sets of cam plates are intended for use in selectively finishing opposite sides of the teeth of the gears 45 and 68, as will be described more fully hereinafter.

One or other of the sets of cam plates is adapted to be brought into engagement with the roller 142 for the lapping or burnishing of opposite sides of the teeth by moving the cam shaft 122 axially as will be described later. The roller 142 is secured to a slide 143 that is reciprocable in suitable guides formed on the bracket or arm 136. This slide 143 carries at its opposite end a roller 144 which engages the nose of an adjustable block 145 (Figs. 4, 11 and 12) which is carried by the arm 147 of the yoke member 148 (Figs. 5 and 6).

The yoke member 148 surrounds the sleeve 149 of the bevel gear 150 which is keyed to the carrier 62. During the operation of the machine the yoke 148 is secured to the sleeve 149 of the bevel gear 150 against movement so that when the cam shaft 122 rotates, the slide 143 will be moved back and forth in the bracket 136, the amount of its movement depending upon the conformation of the cams 139 and 140 and this movement of the slide 143 will be transmitted through the roller 144, the yoke 148 and the sleeve 149 of the bevel gear to which the yoke is connected to the carrier 62, whereby the gear spindle 63 will be oscillated about an axis eccentric of its axis, namely, about the center of the carrier 62 to move the gear up and down and in and out simultaneously relative to the pinion 45. This movement causes the tooth surfaces of the gear to slide over the tooth surfaces of the pinion and so wear down and smooth out the tooth surfaces of both members.

The cam plates 139 and 140 are formed as removable plates which may be secured in slots or recesses provided therefor in the disc 138. They are not completely coextensive with the periphery of the disc 138. As the periphery of the disc is, of course, concentric with its axis, it follows, then, that dwells will occur between the plates 139 and 140 during which time the carrier 62 will not oscillate but will be stationary. The cams 139 and 140 act to shift the bearing from the center to first one end and then the other of the teeth of the gears while during the time the carrier is stationary the gears roll together in their correct meshing position. One cam plate 139 in each set will be made to cause an oscillating movement in the opposite direction from the other plate 140 of the set and of greater extent and duration than the other plate 140 of the set. The plate 139 is arranged to move the bearing toward the heels of the teeth to wear away the mating tooth surfaces more at the heels than at the toes. The cam plates 139 and 140 for use in burnishing or lapping one side of the teeth of the gears are of different conformation from the corresponding cam plates used in the burnishing or lapping of the opposite sides of the teeth. For instance, the plate 139 which gives the longer oscillating motion to the carrier 62 will have its periphery formed on a greater radius than the radius of the disc 138 when the coast sides of the gears are being lapped or finished, while the larger cam plate 139 used in lapping or burnishing the drive sides of the teeth will be formed on a radius less than the radius of the disc 138. The reverse is true in both instances of the smaller cam plates 140. Through this arrangement the bearing can be moved toward the heels or outer ends of the teeth of the gears on both sides. It is understood, of course, that the cam plates 139 and 140 may be formed with dwells so that the gears will run together for an appreciable length of time with the bearing at the heel or toe as the case may be. The pinion spindle or gear spindle as the case may be, is rotated in one direction for finishing the drive sides of the teeth and in the opposite direction for finishing the coast sides of the teeth, the motor 73 or drive to pulley 116 as the case may be being reversible for this purpose.

To bring the respective sets of cams 139 and 140, which are to be used in lapping or burnishing opposite sides of the teeth, into operative relation with the roller 142, the shaft 122 is shifted axially in its bearing. This axial movement can be effected by moving the hand lever 155 (Fig. 11) to shift the yoke 156 which engages the groove 157 in the cam shaft 122. When the lever 155 is in neutral position, the roller 142 will be engaged with the periphery of the disc 138 itself and no motion will be transmitted to the carrier 62. This position is used when testing the gears to determine the progress of the burnishing or lapping operation. So after the lapping or burnishing operation has proceeded for what is estimated to be a sufficient length of time, the lever 155 may be shifted into neutral position and the gears being lapped or burnished may be tested to see whether the desired results have been attained. The gears can be run in both directions for the tests and under load by applying the hand brake. If the test is satisfactory, the burnishing or lapping operation will be considered complete and if not, the lever 152 may be shifted from neutral position in one or the other direction to bring either the cam 139 or the cam 140 into operative relation with the roller 142 to permit continuation of the burnishing or lapping operation on whichever side of the teeth further burnishing or lapping is required as determined by the test.

The operation of the machine is illustrated diagrammatically in Fig. 1, in which the reference numerals used in designating the various parts of the machine are again employed to designate the same parts in the diagram. As the yoke 148 is secured to the carrier 62 during the operation of the machine, the two are considered integral in the diagram for the purposes of simplicity and clearness. As has already been described, the gear 68 to be lapped or burnished is journaled in the carrier 62 with its axis 160 arranged eccentrically of the axis 161 of the carrier. The set of cam plates 139 and 140 designated in Fig. 1 and facing the reader are not in operative position. It is the other set of cam plates appearing behind these plates which are in operative relation with the roller 142. It will be seen that as one of the spindles is rotated, the gear 68 or pinion 45 will be driven and will rotate the other member of the pair by the inter-engaging action of the teeth of the two gears and that as the cam shaft 122 rotates simultaneously the carrier 62 will be oscillated first in one direction and then in the other to oscillate the axis of the gear spindle on the circle 162 circumscribed about the axis 161 of the carrier as a center. The amount of oscillation will depend upon the conformation of the cams 139 and 140 and between the oscillations there will be dwells where the roller 142 engages the periphery of the disc 138. When the gears are being lapped, the application of the service or hand brake will increase the lapping or wearing away action at any desired point along the teeth while in burnishing, it is possible to effect a pressure between the teeth of the gears by bottoming the teeth of one member in the tooth spaces of the other, to augment the wearing away action caused by the oscillation of the carrier and running of the gears in mesh.

The carrier 62 is made adjustable relative to the yoke 148 so as to position the axis 160 of the gear spindle 63 at any desired angular position about the axis 161 of the carrier 62. This adjustment can be effected by rotating through the pinion shaft 164, the pinion 165 (Figs. 6 and 8) which meshes with the gear 150 after having first unlocked the carrier 62 from the yoke 148. After the desired adjustments have been effected the carrier and yoke are locked together again to remain locked during the operation of the machine. The locking device may be of any suitable character. As shown, it consists of a threaded member 167 which threads into a sleeve 168 which is secured to the yoke 148 and this threaded member 167 is provided with a head 169 which is adapted to frictionally engage the sleeve 149 of the bevel gear 150 to clamp the yoke to the bevel gear. The bevel gear is already secured to the carrier 62 by a key and consequently when the threaded member 167 is in clamping position the yoke and carrier move together as one piece.

The effect of adjustment of the carrier 62 relative to the yoke is shown diagrammatically in Figure 2. Here 161 again designates the axis of the carrier and 162 the circle on which the axis of the gear spindle moves during oscillation of the carrier. If the carrier is adjusted so that the axis of the gear spindle is at the position A on the horizontal center line of the machine, any slight oscillatory movement of the carrier would move the gear spindle above and below the center line with practically no change in cone apex position. In other words, the gear would have an up and down movement with relation to the pinion with practically no in and out movement. If, on the other hand, the carrier was adjusted relative to the yoke so that the spindle axis assumed the position B any slight oscillatory movement of the carrier would simply shorten or lengthen the cone distance of the two gears with practically no change in their relative vertical position. If, however, the carrier 62 is adjusted relative to the yoke to position the gear axis at C and the carrier is oscillated to move the spindle axis from C to D, then the gear 68 will have an up and down movement through the distance E and an in and out movement through the distance F relative to the pinion. It will be seen, therefore, by adjusting the carrier relative to the yoke, any desired proportion of vertical to horizontal movement of gear relative to pinion can be obtained and since the carrier can be adjusted through 360° it will be seen an infinite number of variations of these movements is possible and by changing the cams 139 and 140 the extent and occurrence of the oscillating movements in the cycle can also be regulated. When the carrier is adjusted in the yoke, the slide 54 must be adjusted on the column 22 to bring the axes of the spindles 63 and 44 into the correct position.

To hold the nose of the contact piece 145 (Figs. 11, 12, 4 and 13) continuously in engagement with the roller 144, a coil spring 170 (Figs. 5 and 13) is provided. This spring is mounted upon a rod 171 and engages at one end a lug 172 which is in threaded engagement with the rod and at its other end with a washer 173 that is in engagement with the forked end of an arm 175 formed integral with the yoke member 148. The rod 171 is held at its lower end in a bracket 176 which is secured to the slide 54. When the rod 171 is turned the lug 172 is moved to vary the tension on the spring 170. This lug 172 moves in suitable guide ways 178 formed integral with or secured to the slide 54. The spring 170 serves at all times to hold the nose of the contact piece 145 in engagement with the roller 144 so that any motion of the cam 138—139—140 is transmitted to the yoke and thence to the carrier oscillating the gear spindle 63.

Ordinarily in lapping or burnishing spiral bevel gears on a machine of this invention, the gears will be positioned with their axes intersecting as shown in Figs. 1 and 3. It is within the contemplation of this invention, however, to lap the gears in an offset position where a particular form of bearing is desired or where it is desired to eliminate bias bearing. It is also within the contemplation of this invention to provide a method and apparatus for lapping and burnishing hypoid gears. To these ends, the vertical adjustment of the slide 54 already described is provided. By means of this adjustment the axis of the gear can be offset any desired distance from the axis of the pinion, as shown in Figure 16, where a pair of gears comprising a pinion 180 and a gear 181 are shown in position ready for finishing on the machine described. Here the axis of the pinion 180 is offset from the axis of the gear 181.

When the slide 54 is adjusted vertically on the column 22, the bracket 136 is adjusted angularly on the plate 133 (Figs. 11 and 12) to maintain the roller 144 in contact with the piece 145 and at the same time the contact piece 145 is adjusted to maintain its nose in a vertical plane whereby the motion of the slide 143 under actuation of the cam 139—138—140 may be correctly transmitted to the yoke 148 and the carrier 62.

The bracket 136 can be secured in any position of its angular adjustment by means of the T-bolts 185 which engage in the arcuate T-slot formed in the face of the plate 133. The adjustment of the contact piece 145 is effected by turning the screw threaded rod 188 (Figs. 3, 4, 5, and 13) which is in threaded engagement with the arm 147 of the yoke 148.

In order to disengage the contact piece 145 from the roller 144 to permit of the vertical adjustment of the slide 54, a throw-out cam 190 (Figs. 13 and 14) is provided. This cam is mounted upon a stub shaft 191 which can be rotated by a crank or wrench and engages a nose or lug 192 raised on the arm 147 of the yoke member 148. The conformation of the throw-out cam 190 is clearly shown in Fig. 14 and it will be readily understood when the flat face of this cam is in engagement with the nose 192, the contact piece 145 will be held in engagement with the roller 144 by the action of the spring 170 while when the cam is rotated to bring the curved portion of its periphery into engagement with the nose 192, the arm 147 and yoke member 148 will be moved against the action of the spring 170 to disengage the contact piece 145 from the roller 144 and permit of the described adjustment.

When lapping gears, a lapping compound as a mixture of an oil and an abrasive is applied to the gears to assist in wearing away the irregularities on the tooth surfaces and concentrating the bearing where desired. The lapping compound may be applied by the operator with a brush or a chain may be used to convey it from a trough below the gears onto the gears or it may be put on by compressed air or in any other suitable manner. I prefer to pump the lapping compound onto the gears, however, and prefer to use for this purpose apparatus such as illustrated. Secured to the base of the machine in any suitable manner is a reservoir 195 (Fig. 3) for holding the lapping compound. The lapping compound is pumped from this reservoir 195 by a pump of any suitable construction, preferably a centrifugal pump, which may be actuated by the motor 196. The lapping compound is pumped from the reservoir through the flexible hose 197 and the nozzle 198 (Figs. 3 and 4) onto the gears at any desired point as may be determined by experience. A trough 199 is arranged below the gears to catch the compound as it runs off the gears. An opening is provided in the bottom of this trough and a pipe 200 is threaded into this opening to conduct the compound from the trough 199 back to the reservoir 195 whence it may be pumped back onto the gears for use again. The reservoir 195 is preferably provided with a removable cover so that the operator can get at the compound and add from time to time more oil or more abrasive as may be required to mix the two to maintain a uniform mixture, although it will be understood that where a centrifugal pump is used, the pump itself will keep the mixture stirred up. An outlet, closed by a screw plug 202 is provided at the bottom of the reservoir 195 to permit draining off the compound or any sediment. The nozzle 198 is held in a split clamp 203 and can be clamped by the bolt 204 which serves also to clamp the split clamp 205 which engages the rod 206 which is adjustable in a socket 207 formed integral with the trough 199. Through the adjustment of the split clamps 203 and 205 and of the rod 206, a practically universal angular adjustment of the nozzle 198 can be obtained, to throw the lapping compound onto the gear 68 at any desired point. The rod 206 can be secured in any adjusted position in the socket 207 by means of the set screw 208.

When burnishing gears, the lapping compound is not used, but the pump may be employed to pump the burnishing lubricant onto the gears although the lubricant may also be put on with a brush. The gears are simply run together while tooth surfaces of one are moved across the other through the eccentric motion of the gear spindle. In this case the gear may be the driver and the gear spindle may be driven from the pulley 116 (Fig. 6) in the manner already described. It is also within the contemplation of this invention to use the pinion as the driver for burnishing. If this is the case, the backlash brake will ordinarily be employed so as to maintain sufficient uniform braking load on the gears being burnished to counteract any backlash between their teeth. The hand or service brake may or may not be used as desired. Instead of using the hand or service brake, I have found it preferable ordinarily to apply pressure between the gears in burnishing by bottoming the teeth of one gear in the tooth spaces of the other. To avoid breakage of the teeth when so bottomed, because of any irregularities in teeth of the gears being burnished, I prefer to hold the gears in engagement resiliently and for this reason instead of fixedly securing the head 21 in any adjusted position with the teeth of one gear bottomed in the tooth spaces of the other, I prefer to use the resilient connection illustrated in Figure 15. Here the head 21 is adjusted by rotating the hand wheel 26 to move the pinion 45 into engagement with the teeth of the gear 68 so that the teeth of the pinion will bottom in the tooth spaces of the gear. When this is done, however, the head 21 is not locked to the base or frame 20 but is held resiliently in position by the spring 40. If, then, there is any irregularity in the teeth of either member which would tend to throw the teeth out of mesh, the head 21 and the screw 24 will be moved bodily outwardly compressing the spring 30 so that no breaking of the teeth can occur.

Where the machine is to be used in production work in which a great number of gears of the same size and ratio are to be lapped or burnished, it can be readily determined just how long the gears to be lapped or burnished should be run together to finish them. To avoid waste of time and to avoid lapping or burnishing the gears too long, I have provided an automatic stop for stopping the machine after the gears have run together the required length of time necessary for finishing them. As a stop control mechanism there is preferably employed a control device such as described in the patent to Hill No. 1,577,121 of March 16, 1926. This control device indicated at 210 (Figs. 4, 11 and 12) is mounted upon a suitable bracket 211 secured to the column 22. The plunger 214 of the control device is actuated by a cam 215 which is keyed to the cam shaft 122. The control device can be set to stop the machine after any variable predetermined number of rotations of the cam shaft 122. The control device may operate directly upon the motors 121 and 73 through electrical connections. The cam 215 has a long face to maintain operative relation with the plunger 214 in either position of adjustment of the cam shaft 122.

The movable parts of the machine are suitably guarded at all points necessary to prevent any possible injury to the operator. Thus, the end of the pinion shaft 44 is guarded by the guard 220 (Fig. 3) while the bearing 135 acts as a guard for one end of the cam shaft 122 and the bracket 222 in which the yoke 156 for shifting the cam shaft 122 is housed, acts as a guard at the other end of this cam shaft. The cap 224 (Fig. 5) serves to guard the gear shaft 63 at one end when the backlash brake is being used, while a guard 226 may be employed (Fig. 6) when the gear shaft is driven positively from the pulley 116. A guard 228 (Figs. 3 and 4) which is pivotally mounted on the trough 199 serves as a guard around the pinion at the point of its contact with the gear, eliminating any possibility of injury to the operator, preventing any foreign articles from getting into the teeth of the gears and preventing the lapping compound being spattered over the operator or into the other parts of the machine. This guard 228 is shown in its lowered position, but it will be understood that it is raised and locked in position around the pinion when the machine is running.

The present machine is intended primarily for lapping or burnishing gears but a further feature of this machine is that it may be used for testing tapered gears either as auxiliary to the lapping or burnishing operation as described above or as a primary operation in itself regardless of whether gears are lapped or burnished. The adjustments of the two heads 21 and 22, the adjustments of the slide 54 and the adjustment of the carrier 62 in the yoke 148 permit of positioning a pair of gears 45 and 68 to be tested in mesh in any desired relation while through the hand brake any desired load can be applied to the gears while running together to test their quietness and running qualities.

It is believed that the invention will be clearly understood from the preceding description. While the present invention has been described in connection with a specific structure and in connection with specific uses for said structure, it is to be understood that the invention is capable of various further modifications, adaptations, and uses and that this application is intended to cover any adaptations, uses, or embodiments of the present invention, following, in general, the principles of the invention and including such departures from the present disclosures as come within known or customary practice in the gear art and as may be applied to the essential features hereinbefore set forth and as fall within the scope of the invention or the limits of the appended claims.

Having thus described my invention, what I claim is:

1. In a machine for finishing gears, a rotatable spindle, means for detachably securing a gear to said spindle, an oscillatable carrier, a second spindle eccentrically journaled in said carrier, means for detachably securing a gear to the second spindle, means for adjusting the spindles relatively to each other to bring the gears carried thereby into mesh, means for rotating one of said spindles, and means for simultaneously oscillating said carrier.

2. In a machine for finishing gears, a rotatable spindle, means for detachably securing a gear to said spindle, a movable carrier, a second spindle journaled in said carrier, means for detachably securing a gear to said second spindle, means for adjusting the spindles relatively to each other to bring the gears carried thereby into mesh, means for rotating one of said spindles, and means for simultaneously actuating said carrier to produce a combined relative movement between the gears while in mesh in a direction transverse to their teeth and in a direction at an angle to the last named movement.

3. In a machine for finishing gears, a rotatable spindle, means for detachably securing a gear to said spindle, a movable carrier, a second spindle journaled in said carrier, means for detachably securing a gear to said second spindle, means for adjusting the spindles relatively to each other to bring the gears carried thereby into mesh, means for rotating one of said spindles, and means for simultaneously actuating said carrier to produce a combined relative movement between the gears, while in mesh, in a direction transverse to their teeth and in a direction substantially longitudinal of the axis of one gear.

4. In a machine for finishing gears, a rotatable spindle, means for detachably securing a gear to said spindle, a movable carrier, a second spindle journaled in said carrier with its axis angularly disposed to the axis of the first spindle, means for adjusting the spindles relatively to each other to bring the gears carried thereby into mesh, means for rotating one of said spindles, and means for simultaneously actuating said carrier to produce a combined relative movement between the gears, while in mesh, transverse to their teeth and in a direction substantially longitudinal of the axis of one gear.

5. In a machine for finishing gears, a rotatable spindle, means for detachably securing a gear to said spindle, an oscillatable carrier, a second spindle journaled in said carrier with its axis parallel to but offset from the axis of said carrier and angularly disposed to the axis of the first spindle, means for adjusting the spindles relatively to each other to bring the gears carried thereby into mesh, means for rotating one of the spindles, and means for simultaneously oscillating said carrier.

6. In a machine for finishing gears, a frame, a pair of spindles rotatably mounted on the frame, means for detachably securing a gear to each of said spindles, means for rotating one of said spindles, and means for pumping a lapping compound on the gears while running in mesh.

7. In a machine for finishing gears, a frame, a pair of spindles rotatably mounted on the frame, means for detachably securing a gear to each of said spindles, means for rotating one of said spindles, a reservoir secured to the frame, means for pumping a lapping compound from said reservoir onto the gears while running in mesh comprising a pump, the impelling portion of which is immersed in the lapping compound in the reservoir, and means for conducting the lapping compound from the reservoir onto the gears, a receptacle below the gears for catching the compound, and means for conducting compound from said receptacle back to said reservoir.

8. In a machine for finishing gears, a rotatable spindle, means for detachably securing a gear to said spindle, a carrier, a second spindle journaled in said carrier with its axis angularly disposed to the axis of the first spindle, means for adjusting one of said spindles so that its axis is offset from the axis of the other spindle, means for adjusting the spindles relatively to each other, also, to bring the gears carried thereby into mesh, means for rotating one of said spindles, and means for simultaneously oscillating said carrier.

9. In a machine for finishing gears, a rotatable spindle, means for detachably securing a gear to said spindle, a carrier, a second spindle journaled in said carrier with its axis parallel to the axis of the carrier and angularly disposed to the axis of the first spindle, means for adjusting one of said spindles so that its axis is offset from the axis of the other spindle, means for adjusting the spindles relatively to each other, also, to bring the gears carried thereby into mesh, means for rotating one of said spindles, and means for simultaneously oscillating said carrier.

10. In a machine for finishing gears, a frame, a pair of heads mounted on the frame, a carrier oscillatably mounted in one of said heads, a pair of spindles having their axes angularly disposed to each other, one of which is eccentrically journaled in said carrier and the other of which is journaled in the remaining head, means for detachably securing a gear to each of said spindles, means for adjusting said heads relatively to each other to bring the gears into mesh, a cam shaft journaled in the frame, a cam secured thereto, cooperating means between said cam and carrier adapted to oscillate said carrier on rotation of said cam, means for rotating one of said spindles, and means for simultaneously rotating said cam shaft.

11. In a machine for finishing gears, a frame, a pair of heads mounted on the frame, a carrier rotatably mounted in one of said heads, a pair of spindles having their axes angularly disposed to each other, one of which is journaled in one head and the other of which is eccentrically journaled in said carrier, means for detachably securing a pair of tapered gears to said spindles, means for adjusting said heads relatively to each other to bring the gears into mesh, a cam shaft journaled in said frame, a cam secured thereto, means operatively connecting said cam to said carrier, said cam being constructed to oscillate said carrier in opposite directions for shifting the bearing between the teeth of the gears toward and from the ends of the teeth and with a dwell between each of said movements, means for rotating one of said spindles, and means for simultaneously rotating said cam shaft.

12. In a machine for finishing gears, a frame, a pair of heads mounted on the frame, a carrier rotatably mounted in one of said heads, a pair of spindles having their axes angularly disposed to each other, one of which is journaled in one head and the other of which is eccentrically journaled in said carrier, means for detachably securing a pair of tapered gears to said spindles, means for adjusting said heads relatively to each other to bring the gears into mesh, a cam shaft journaled in said frame, a cam secured thereto, means operatively connecting said cam shaft to said carrier, said cam being constructed to oscillate the carrier twice in each rotation for effecting a movement between the gears to shift the bearing between the teeth of the gears toward and from the ends of the teeth and with a dwell between each of said movements, and said cam being further constructed so that the oscillating movements are of different duration, means for rotating one of said spindles and means for simultaneously rotating said cam shaft.

13. In a machine for finishing gears, a frame, a pair of heads mounted on the frame, a carrier rotatably mounted in one of said heads, a pair of spindles having their axes angularly disposed to each other, one of which is journaled in one head and the other of which is eccentrically journaled in said carrier, means for detachably securing a pair of tapered gears to said spindles, means for adjusting said heads relatively to each other to bring the gears into mesh, a cam shaft journaled in the frame, a pair of cams secured thereto adapted to be employed, respectively, in finishing opposite sides of the teeth of the gears, a follower adapted to engage either cam, means operatively connecting said follower to said carrier to oscillate said carrier on rotation of either cam, and means for moving said cam shaft axially to bring either of said cams selectively into operative engagement with said follower.

14. In a machine for finishing gears, a frame, a pair of heads mounted on the frame, a carrier rotatably mounted in one of said heads, a pair of spindles having their axes angularly disposed to each other, one of which is journaled in one head and the other of which is eccentrically journaled in said carrier, means for detachably securing a pair of tapered gears to the spindles, means for adjusting the heads relatively to each other to bring the gears into mesh, a cam shaft journaled in the frame, a cam secured thereto, means operatively connecting said cam to said carrier to oscillate said carrier on rotation of said cam, means for rotating one of said spindles, means for simultaneously rotating said cam shaft, a second cam secured on said cam shaft, and an automatic stop mechanism actuated by said second cam to stop the machine after a predetermined variable number of revolutions of said cam shaft.

15. In a machine for finishing gears, a frame, a pair of heads mounted on the frame, a slide adjustably mounted on one of said heads, a pair of spindles having their axes angularly disposed to each other, one of which is mounted on the slide and the other of which is mounted on the remaining head, an oscillatable carrier in which one of the spindles is eccentrically journaled, means for securing a gear to each of said spindles, means for adjusting the gears into mesh, means for adjusting said slide to offset the axis of one spindle relative to the axis of the other, means for rotating one of said spindles, and means for simultaneously oscillating said carrier.

16. In a machine for finishing gears, a frame, a pair of gears mounted on the frame, a slide adjustably mounted on one of said heads, a pair of spindles having their axes angularly disposed to each other, one of which is mounted on the slide and the other on the remaining head, an oscillatable carrier in which one of said spindles is eccentrically journaled, means for securing a gear to each of said spindles, means for adjusting said slide to offset the axis of one gear relatively to the axis of the other, means for adjusting the heads to bring the gears into mesh, means for rotating one of said spindles, means for simultaneously oscillating said carrier, and means for pumping a lapping compound onto the gears while in mesh.

17. In a machine for finishing gears, a pair of heads mounted on the frame, a carrier oscillatably mounted in one of the heads, a pair of spindles, one of which is journaled eccentrically in said carrier and the other of which is journaled in the remaining head, means for rotating one of said spindles, means for simultaneously oscillating said carrier, means for applying a continuous brake load to one of said spindles to eliminate backlash between the gears being finished, a second brake secured to said spindle and manually operable means to actuate said second brake to vary the pressure between the teeth of the gears while running in mesh.

18. In a machine for finishing gears, a frame, a pair of heads mounted on the frame, a yoke journaled in one of said heads, a carrier mounted in said yoke coaxially thereof, a pair of spindles having their axes angularly disposed to each other, one of which is eccentrically journaled in said carrier and the other of which is journaled in the remaining head, a cam shaft journaled in the frame, a cam mounted thereon, means operatively connecting the cam with the yoke to oscillate the yoke on rotation of the cam, means for adjusting the carrier in the yoke to adjust the spindle mounted in said carrier angularly about the axis of said yoke, means for locking the carrier to the yoke after adjustment, means for rotating one of said spindles, and means for simultaneously rotating said cam.

19. In a machine for finishing gears, a frame, a pair of heads mounted on the frame, a carrier journaled in one of said heads, a pair of spindles having their axes angularly disposed to each other, one of which is journaled in said carrier and the other of which is journaled in the remaining head, means for detachably securing a gear to each spindle, a cam shaft journaled in the frame, a cam secured to said shaft, a sliding member provided with a pair of rollers, one at each end, one of which engages said cam and the other of which is in operative engagement with said carrier means constantly urging said carrier into operative relation with the last named roller, and means operable to disengage said carrier from said roller.

20. In a machine for producing gears, a frame, a pair of heads mounted on the frame, a slide adjustable on one of said heads, a yoke member oscillatably mounted in said slide, a pair of spindles having their axes angularly disposed to each other, one of which is journaled eccentrically in said yoke member and the other of which is journaled in the remaining head, means for detachably securing a gear to each spindle, a cam shaft journaled in said frame, a cam secured thereto, a bracket angularly adjustable on said frame, a sliding member reciprocable in said bracket and provided with a pair of rollers, one of which is adapted to engage said cam and the other of which is engageable with said yoke, means constantly urging said yoke into engagement with the last named roller, means for adjusting the slide to offset the axes of the spindles relatively to each other, means for rotating one of said spindles and means for simultaneously rotating said cam shaft.

21. In a machine for finishing gears, a frame, a pair of heads mounted on the frame, a carrier oscillatably mounted in one of said heads, a pair of spindles having their axes angularly disposed to each other, one of which is rotatably mounted in said carrier, and the other of which is journaled in the remaining head, means for adjusting the heads relatively to each other to bring the gears into mesh including means for adjusting one of the heads so that the tops of the teeth of one gear engage with the bottom of the tooth spaces of the other, said last named means including a nut secured to said head, a screw threading into said nut, a collar on the screw adapted to engage the frame during rotation of the screw in one direction, a second collar spaced from the first and from said frame and a spring interposed between said second collar and the frame for resiliently holding the head in adjusted position.

22. In a machine for finishing gears, a rotatable spindle, means for detachably securing a gear to said spindle, an oscillatable carrier, a second spindle eccentrically journaled in said carrier, means for detachably securing a gear to the second spindle, means for adjusting the spindles relatively to each other to bring the gears carried thereby into mesh, means for rotating one of said spindles, and means for oscillating said carrier at predetermined intervals to effect a relative in and out movement and a back and forth transverse movement between the gears while certain portions of their teeth are in mesh.

23. The method of finishing gears which consists in rotating a pair of gears in mesh while simultaneously producing between the gears an in and out movement longitudinally of the axis of one gear and a back and forth movement transversely of the teeth of the gears.

24. The method of finishing tapered gears which consists in bringing the pair of tapered gears to be finished into mesh with their axes angularly disposed to each other, rotating the gears in mesh and simultaneously oscillating one of the gears relative to the other about an axis parallel to and eccentrically disposed to its own axis.

25. The method of finishing gears which consists in meshing a pair of tapered gears so that the teeth of one bottom in the tooth spaces of the other and while holding said gears yieldably in this position, rotating the gears in mesh and simultaneously moving one of said gears relative to the other about an axis parallel to and eccentric of its own axis.

26. The method of finishing gears which consists in meshing a pair of tapered gears so that the teeth of one bottom in the tooth spaces of the other and while holding said gears yieldably in this position, rotating the gears in mesh while simultaneously oscillating one of said gears relative to the other about an axis parallel to and eccentric of its own axis.

27. In a machine for finishing gears, a frame, a pair of heads mounted on the frame, a yoke journaled in one of said heads, a carrier rotatably adjustable in said yoke, a pair of spindles having their axes angularly disposed to each other, one of which is journaled in said carrier with its axis parallel to and eccentric of the axis of said carrier and the other of which is journaled in the remaining head, means for rotating one of said spindles, and means for simultaneously actuating the yoke to move the carrier on its axis.

28. In a machine for finishing gears, a rotatable spindle, an oscillatable carrier, a second spindle journaled in said carrier with its axis angularly disposed to the axis of the first spindle and parallel to but eccentric of the axis of said carrier, means for detachably securing a pair of gears to said spindles, means for adjusting the spindles relatively to each other to bring the gears carried thereby into mesh with the teeth of one gear bottoming in the tooth spaces of the other, means for rotating the gears in mesh, means for simultaneously oscillating said carrier, and means for yieldably holding said gears in mesh in the described position of mesh during the two last named movements.

29. In a machine for finishing gears, a frame, a pair of heads mounted on the frame, a carrier oscillatably mounted on one of said heads, a pair of spindles each of which is adapted to carry a tapered gear, one of which is journaled in one head and the other of which is journaled in said carrier with its axis angularly disposed to the axis of the first spindle and parallel to but offset from the axis of said carrier, means for adjusting the spindles to bring the gears carried thereby into mesh, a cam shaft journaled in the frame, a pair of cams secured thereto adapted to be employed, respectively, in finishing opposites sides of the teeth of the gears, a disc secured to said cam shaft between said cams, the periphery of which is concentric of said cam shaft, a follower secured to said carrier, means for rotating one spindle, means for rotating the cam shaft, and means for adjusting the cam shaft axially to bring the follower selectively into operative engagement with either cam or with said disc.

30. In a machine for finishing gears, a frame, a pair of heads mounted on the frame, a carrier oscillatably mounted on one of said heads, a pair of spindles, each adapted to carry a tapered gear one of which is journaled in one head and the other of which is journaled in said carrier with its axis angularly disposed to the axis of the first spindle and parallel to but offset from the axis of said carrier, means for adjusting the spindles relatively to each other to bring the gears carried thereby into mesh, a cam shaft journaled in the frame, a pair of cams secured thereto adapted to be employed, respectively, in finishing opposite sides of the teeth of the gears, a disc secured to said cam shaft between said cams, the periphery of which is concentric of said cam shaft, a follower secured to the carrier, means for rotating one spindle, means for rotating the cam shaft, means for adjusting said cam shaft axially to bring the follower selectively into operative engagement with either cam or into engagement with said disc, and manually operable means for applying a brake-load to said gears while running in mesh.

31. In a machine for finishing gears, a frame, a pair of heads mounted on the frame, a carrier oscillatably mounted on one of said heads, a pair of spindles, each adapted to carry a tapered gear, one of which is journaled in one head and the other of which is journaled in said carrier with its axis angularly disposed to the axis of the first spindle and parallel to but offset from the axis of said carrier, means for adjusting said spindles relatively to each other to bring the gears carried thereby into mesh, a cam shaft journaled in the frame, a pair of cams secured thereto adapted to be employed, respectively, in finishing opposite sides of the teeth of the gears, a disc secured to said cam shaft between said cams, the periphery of which is concentric of said cam shaft, a follower secured to said carrier, means for rotating one of said spindles, means for rotating the cam shaft, means for adjusting said cam shafts axially to bring said follower selectively into operative engagement with either cam or into engagement with said disc, means adjustable to apply a continuous brake-load to one of said spindles to eliminate backlash between the gears, and manually operable means for applying a brake-load to said gears.

32. In a machine for finishing gears, a rotatable spindle, an oscillatable carrier, a second spindle journaled in said carrier with its axis angularly disposed to the axis of the first spindle and parallel to but eccentric of the axis of said carrier, means for detachably securing a gear to each of said spindles, means for adjusting the spindles relatively to each other to bring the gears carried thereby into mesh, means for rotating one of said spindles, means for simultaneously oscillating said carrier, and means for automatically stopping said movements after a predetermined variable number of oscillations of said carrier.

ALTON P. SLADE.